United States Patent [19]

Krantz

[11] Patent Number: 4,655,805

[45] Date of Patent: Apr. 7, 1987

[54] FILTER, ESPECIALLY AIR FILTER

[75] Inventor: Anders Krantz, Söderala, Sweden

[73] Assignee: Industriell Arbetshygien i Söderhamn AB, Söderhamn, Sweden

[21] Appl. No.: 800,128

[22] PCT Filed: Feb. 27, 1985

[86] PCT No.: PCT/SE85/00093

§ 371 Date: Oct. 25, 1985

§ 102(e) Date: Oct. 25, 1985

[87] PCT Pub. No.: WO85/04115

PCT Pub. Date: Sep. 26, 1985

[51] Int. Cl.$^4$ .............................................. B01D 46/04
[52] U.S. Cl. ........................................ 55/298; 55/302; 55/323; 55/382; 55/497; 55/521
[58] Field of Search ................. 55/297, 298, 302, 318, 55/320, 323, 325, 328, 337, 486, 380–382, 497, 498, 521

[56] References Cited

U.S. PATENT DOCUMENTS

| 3,568,412 | 3/1971 | Schwab | 55/521 X |
| 3,653,189 | 4/1972 | Miyake et al. | 55/487 X |
| 3,853,508 | 12/1974 | Gordon et al. | 55/302 |
| 4,128,408 | 12/1978 | Poole | 55/498 |
| 4,164,400 | 8/1979 | Wald | 55/302 X |
| 4,304,579 | 12/1981 | Granville | 55/381 |
| 4,398,931 | 8/1983 | Shevlin | 55/302 X |

FOREIGN PATENT DOCUMENTS 0108978 8/1979 Japan ..................................... 55/302

OTHER PUBLICATIONS

American Precision Industries Bulletin #311, "We Clean Air".

Primary Examiner—Charles Hart
Attorney, Agent, or Firm—Larson and Taylor

[57] ABSTRACT

A filter comprises a filtering wall (2) which has a front face and a rear face and which is normally permeated by a medium in a direction from the front face towards the rear face such that the pollutants entrained by the medium are separated at the front face of the filtering wall and the purified medium is allowed to pass through the wall and into a space behind the filtering wall, the flow of medium through said wall being reversible, if so desired, in order to remove said separated pollutants from the front face of the filtering wall so as to clean said wall. According to the invention, the front face of the filtering wall is provided with one or more elastic cover elements (9) which are movable relative to the filtering wall and adapted upon reversal of the flow of medium, by elastic deformation under the action of said flow, to be removed wholly or partly from the wall while working said separated, adhering pollutants in order to facilitate the removal thereof.

10 Claims, 15 Drawing Figures

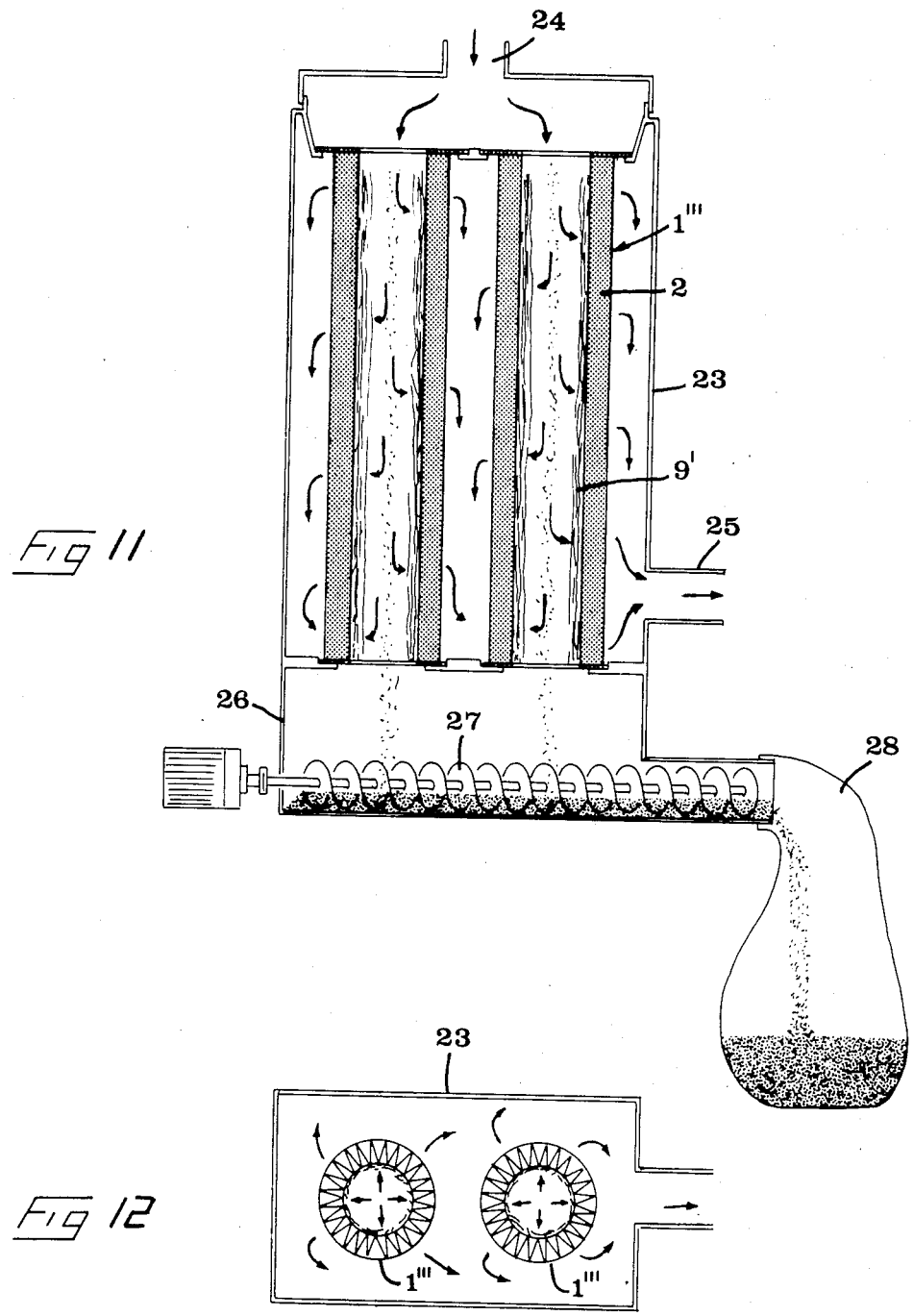

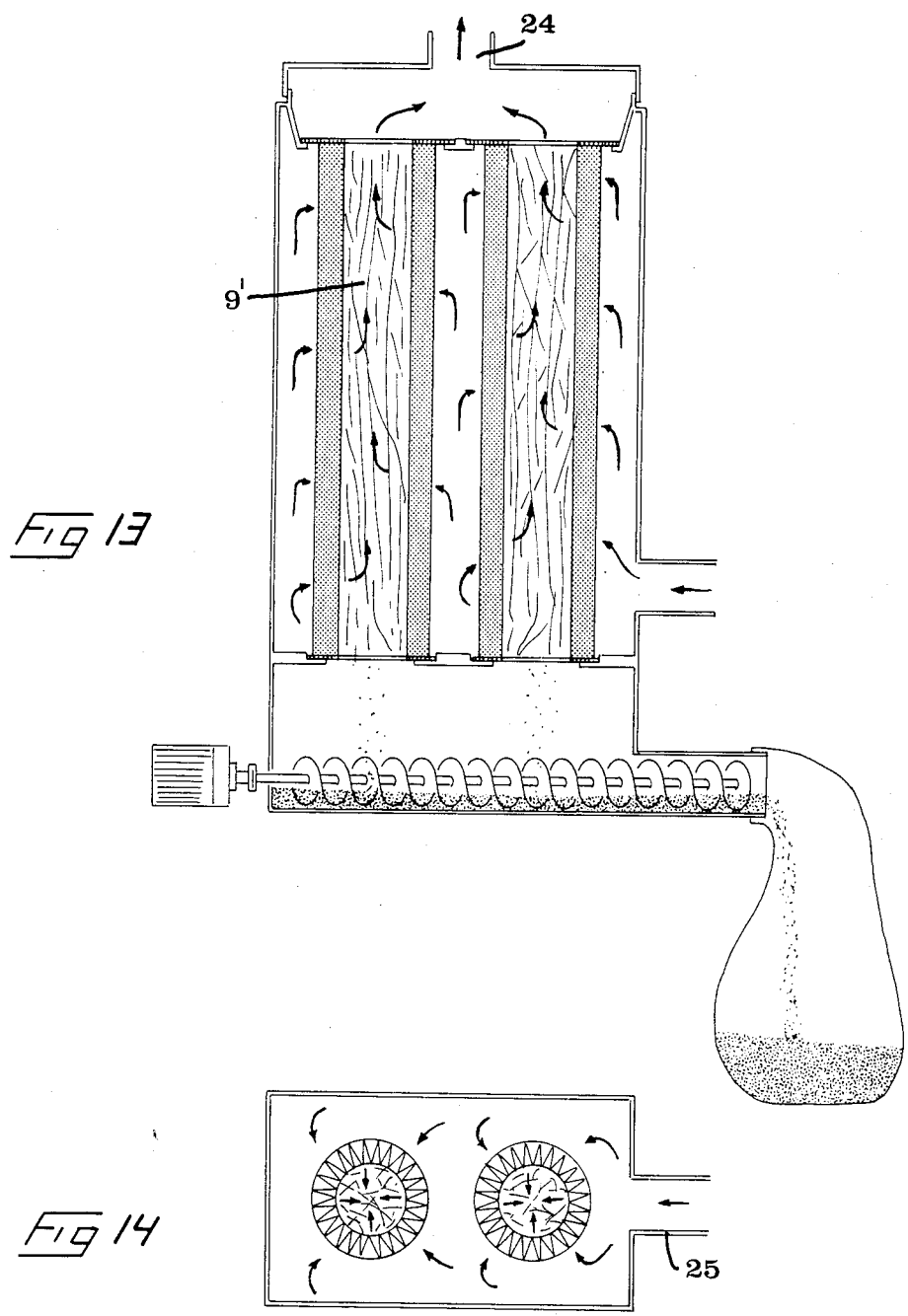

FILTER, ESPECIALLY AIR FILTER

TECHNICAL FIELD OF THE INVENTION

This invention relates to a filter of the type comprising at least one filtering wall which has a front face and a rear face and which is normally permeated by the medium to be purified in a direction from the front face towards the rear face such that pollutants entrained are separated at the front face of the filtering wall and the purified medium is allowed to pass through the wall into a space located behind it, the flow of medium through said wall being reversible, if so desired, in order to remove said separated pollutants from the front face of the filtering wall so as to clean said wall.

BACKGROUND OF THE INVENTION

In conventional air or gas filters of the above-mentioned type, the polluting substances entrained by the air flow and separated by means of the filtering wall tend to adhere so strongly to the filtering wall that it is impossible or at any rate very difficult to remove them when the air flow, as is sometimes the case, is reversed for cleaning the filter. This shortens the life of conventional filters considerably.

BRIEF ACCOUNT OF THE INVENTIVE CONCEPT

The present invention aims at overcoming the above-mentioned drawback by means of a filter which can be efficiently cleaned by reversing the flow of medium, thus considerably increasing the life of the filter. According to the invention, this and further objects are achieved in that the front face of the filtering wall is provided with one or more elastic cover elements which are movable relative to the filtering wall and adapted upon reversal of the flow of medium, by elastic deformation under the action of said flow, to be removed wholly or partly from the wall while working said separated, adhering pollutants in order to facilitate the removal thereof.

BRIEF DESCRIPTION OF THE ACCOMPANYING DRAWINGS

In the drawings,

FIG. 1 is a part-sectional perspective view showing a first alternative embodiment of the filter according to the invention, FIGS. 2 and 3 are sectional views schematically showing a dust separating unit with a filter according to FIG. 1, the filter being illustrated in two states of operation, FIG. 4 is a part-sectional perspective view showing a filter according to the invention in a second alternative embodiment, FIGS. 5 and 6 show the filter of FIG. 4 in two different states of operation, FIG. 7 is a part-sectional perspective view showing another embodiment of a dust separating unit with a filter according to the invention, FIG. 8 is part-sectional perspective view showing the filter of the unit according to FIG. 7, FIGS. 9 and 10 show the filter according to FIG. 8 in two different states of operation, FIG. 11 is a sectional view showing yet another dust separating unit with two filters according to the invention in a first state of operation, FIG. 12 is a cross-section of the unit according to FIG. 11, FIGS. 13 and 14 show the unit according to FIGS. 11 and 12 with the associated filter in a second state of operation, and FIG. 15 is a cross-section of a further alternative embodiment of the filter according to the invention.

DETAILED DESCRIPTION OF A NUMBER OF EMBODIMENTS

Figure 2:
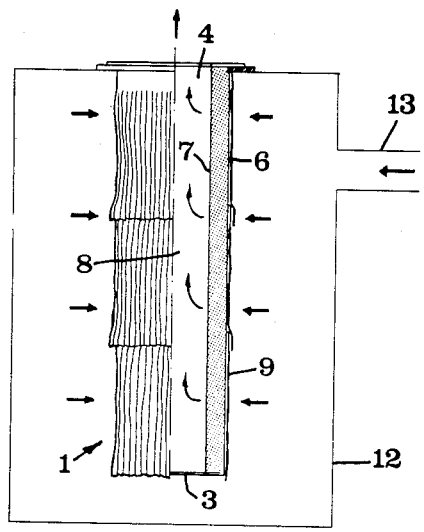
Figure 1:
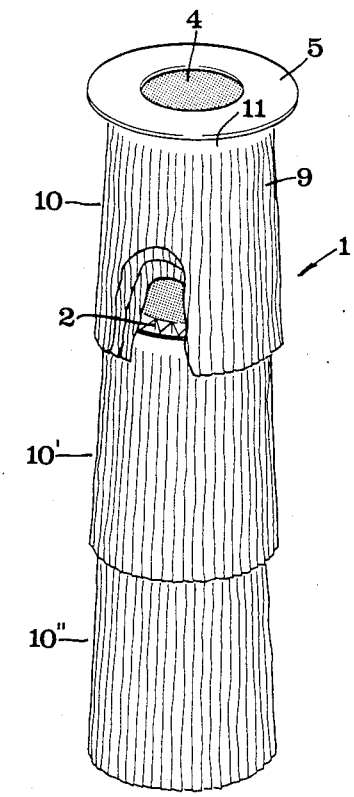
Figure 3:
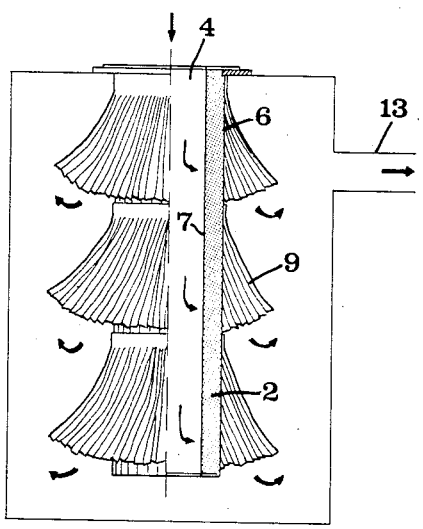

In FIGS. 1-3, the filter generally designated 1 comprises a cylindrical tubular filtering wall 2 which is closed at one end by a bottom wall 3. At its opposite end, the filter tube 2 has an opening 4 which is defined by a connecting flange 5. In actual practice, the tube or wall 2 may consist of a folded rigid filter paper which gives the tube the desired stiffness and allows air to pass therethrough while separating the entrained solid substances or pollutants. In the illustrated embodiment, it is assumed that the polluted air passes through the wall 2 in a direction from outside and in through the wall, as illustrated in FIG. 2. This means that the outer side 6 of the filtering wall 2 forms the front face which is first hit by the throughflowing air, while the inner side of the wall forms the rear face 7 which defines the cavity or space 8 into which the purified air is conducted after the pollutants have been separated at the front face of the filtering wall.

In accordance with the principle of the invention, the external or front face 6 of the filtering wall 2 is provided with a plurality of elastic cover elements which, in this case, consist of a multitude of elongated thin-walled strips which in actual practice are advantageously air-permeable in themselves and suitably arranged so as to cover the entire surface of the wall 2 during normal throughflow of the filter by the air. In the illustrated embodiment, the strips 9 are arranged in three different grass skirt-like sets 10, 10', 10" of which each overlying set at its lower edge partly overlaps the upper edge of the underlying set. In actual practice, each strip 9 may be obtained by cutting transverse slits in an elongated web of material, the length of the slits being slightly less than the width of the web, so as to leave a connecting portion 11 to which the different strips are collectively fixedly anchored. In other words, one end of each strip is fixedly anchored whilst its opposite end, in this case the lower end, is freely movable by the inherent elasticity of the strip. Further, it should be noted that said strip-forming web is wound several turns on the tube 2, thus forming a plurality of superposed layers of strips. In practice, the number of strip layers may be 3-6. Advantageously, the material of the above-described strips is fibrous or of any suitable non-woven type, in particular paper. More preferably, the strip material may also contain a major or minor amount of synthetic fibres of different types, e.g. polyester fibres, which give the strip material electrostatic properties in order to increase the dust absorbing capacity of the material, such that the very strips 9 are capable of performing a substantial part of the dust-separating function of the filter.

In FIG. 2, the filter unit 1 is mounted in a schematically illustrated dust separator 12 into the interior of which the polluted air is sucked through an inlet conduit 13. After passing through the filter tube 2 in a direction from outside and into the tube, the air is discharged in the purified state through the outlet opening 4. Thus, FIG. 2 shows the normal direction of flow of the air through the filter. In this state of operation, the movable strips 9 will be pressed by the throughflowing air against the external or front face 6 of the filter tube 2. The air can pass the strips both through the interstices between the strips and through the very material of the strips since these consist of a fibrous or non-woven air-permeable material. The pollutants which are entrained by the air flowing in through the inlet conduit 13 will thus be deposited both on the filtering wall 2 and on the strips 9 unless they fall directly onto the bottom of the separator casing 12 from where they can be removed at convenient intervals in any suitable manner.

In FIG. 3 is shown how a flow of air to be purified, which is reversed in relation to the direction of flow in FIG. 1, is caused to pass into the filter tube through the opening 4, through the tube and out through the conduit 13 previously serving as inlet. In this case, the air thus passes in a direction from the inner or rear face 7 towards the outer or front face 6. As a result, the strips 9 in the different grass skirt-like sets of strips 10, 10', 10" are set in motion relative to the rigid filter tube 2. More specifically, the free ends of the strips 9 are moved away from the filter tube and are imparted a fluttering or swaying movement during which the strips by their inherent elasticity are also deformed. During this process, the strips will affect or work not only the filtering wall 2 but also one another so as to efficiently loosen and remove the pollutants which, during normal air flow through the filter tube, have previously been deposited on the outer side of the filter tube and on the strips. Experimentally, it has been established that the degree of purification obtained in the filter according to the invention after reversal of the air flow by far exceeds the degree of purification obtained in conventional filters without such strips.

Figure 5:
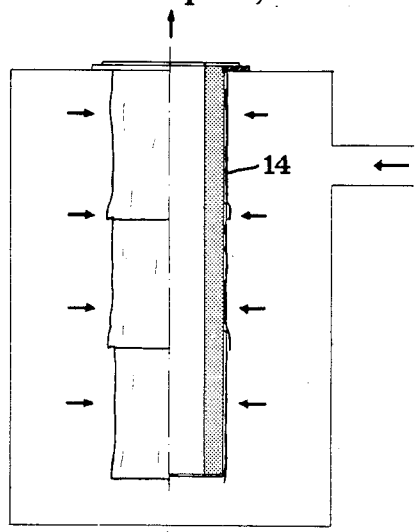
Figure 4:
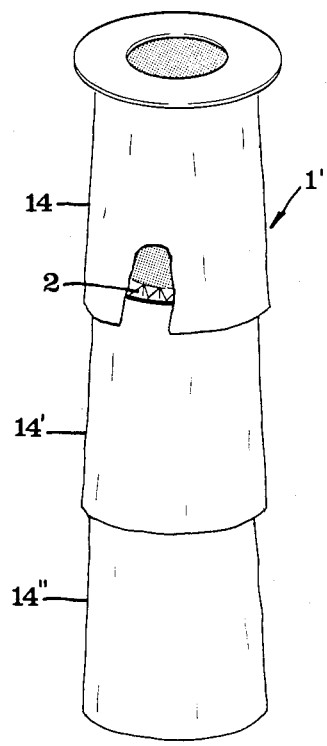
Figure 6:
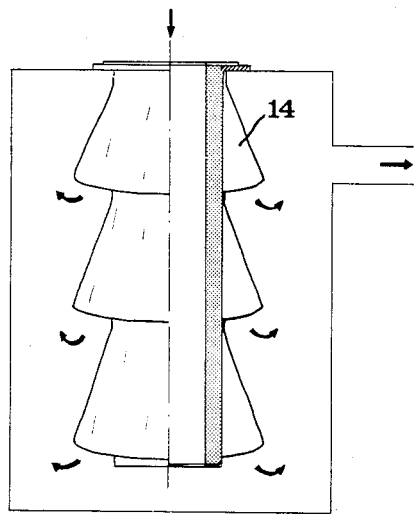

FIGS. 4–6 illustrate an alternative embodiment in which the filter tube 2 has been provided on its outer or front face with a number of skirts 14, 14', 14" which overlap each other in the manner described above but which have no strip-shaped elements of the type described above. In this case, the skirts consist of an air-permeable web of material which has been formed into an endless ring which at least at its lower or overlapping edge portion has a larger diameter than the filter tube 2, such that the skirt can widen when the direction of the air throughflow is reversed from normal throughflow which is illustrated in FIG. 5 and during which the skirts sealingly adhere to the outer side of the filter tube, to reversed throughflow as illustrated in FIG. 6.

Reference is now had to FIGS. 7–10 which illustrate another alternative embodiment of the invention. In this case, it is assumed that the filter 1" according to the invention is mounted in a dust-separating unit which comprises two tubes 15, 16 which communicate with each other and of which the tube 15 has an end filter 17 (e.g. a combined coarse and fine filter), while the tube 16 forms a cyclone separator of which the filter 1" is an integral part.

Figure 8:
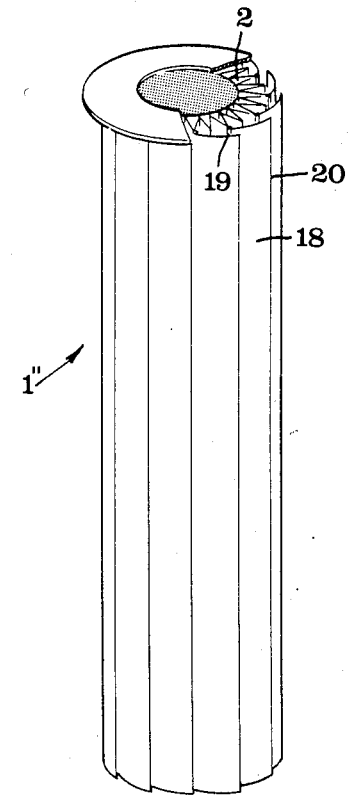

As shown in FIG. 8, the external side of the filter tube 2 is provided in this case with a plurality of elongated thin-walled flap-like cover elements 18 which are fixedly connected to the filter tube 2 along the edge 19 of one long side, while the opposite edge 20 of the other long side is freely movable. In this case, too, each cover element 18 advantageously consists of paper or any other air-permeable elastic material. The elements 18 have such a large width that the free longitudinal edge 20 will at least partly overlap the fixedly anchored longitudinal edge 19 of an adjacent cover element.

Figure 7:
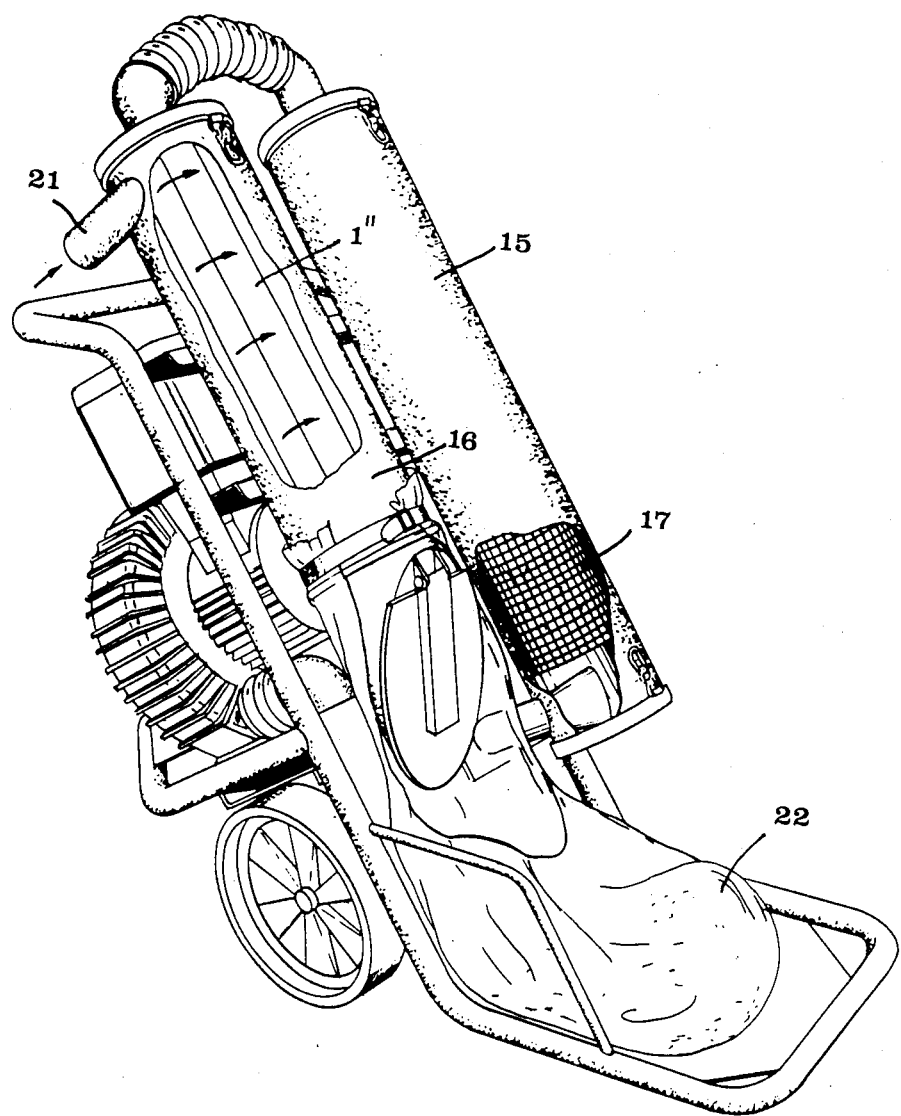
Figure 9:
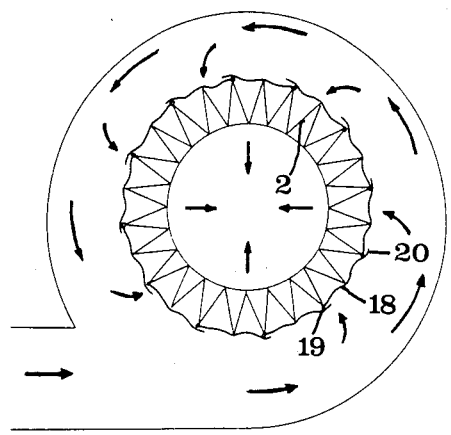
Figure 10:
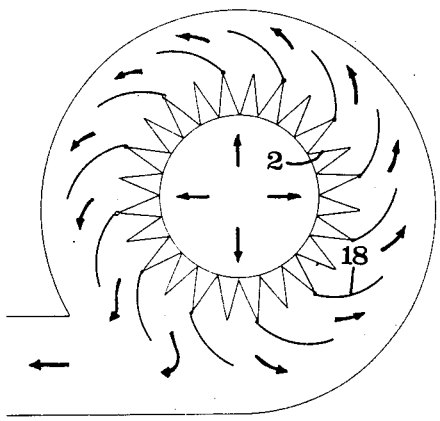

As appears from FIGS. 7, 9 and 10, the polluted air is sucked into the cyclone separator tube 16 through a conduit 21 which in a per se known manner extends tangentially in relation to the tube 16. As a result, the incoming polluted air is imparted a circulatory movement along the inner side of the tube 16, as illustrated in FIG. 9. Thus, the cover elements 18 will be pressed against the outer or front face of the filter tube 2 in that the longitudinal edge 19 connected to the filter tube is located upstream or in front of the free longitudinal edge 20, as seen in the direction of flow of the circulating air. Because of the stiffness of the material in the cover elements 18, these will be pressed to a varying extent into the recesses in the filtering wall 2 which is folded in this case, as intimated in FIG. 9. Under the normal flow condition shown in FIG. 9, the major portion of the solid polluting substances entrained by the air will fall to the bottom of the tube 16 where they are collected in a bag 22 or the like, while a minor amount of pollutants will adhere to the outer side of the filter 1", more exactly on the outer side of the filtering wall 2 and on the cover elements 18.

When the filter 1" should be cleaned, the air flow through the dust separating unit is reversed, as illustrated in FIG. 10, so that the air flow is directed from inside and out through the filter. Thus, the cover elements 18 will be swung out from the filter tube 2 and be imparted a fluttering movement which efficiently separates and removes the previously adhering pollutants, such that they fall down to the bottom of the cyclone tube 16.

When the cleaning operation is completed, the air flow is again reversed to the normal direction as shown in FIG. 9.

In FIGS. 11–14, there is shown a filter 1''' of a type in which the cover elements are arranged inside the filter tube. In other words, the front face of the filtering wall that is first hit by the air flow in this case is the inner side of the filtering wall, while the rear face of the filtering wall is its outer side. Further, the filter tube is here open at both ends. In this embodiment, the cover elements consist of a plurality of strips whose length is substantially equal to the length of the filter tubes 2, the strips being suspended from the upper end of the filter tube while the lower ends of the strips are freely movable.

The dust separating unit 23 illustrated in FIGS. 11–14 comprises a number of filters 1''' (in this case two filters) and has at its upper end an inlet conduit 24 to which both the filters 1''' are connected. At the lower end of the casing of the dust separating unit, there is provided an outlet conduit 25 for purified air. The two filters open at their lower ends into a common collecting box 26 at the bottom of which there is provided a conveyor in the form of a motorpowered screw 27 by means of which collected solid substances can be conveyed to a collecting bag 28.

During the normal flow condition illustrated in FIGS. 11 and 12, polluted air is taken in through the inlet 24 and sucked out through the outlet 25. When passing through the filters 1''', the air presses the strips 9' against the inner sides of the filtering walls. Thus, the strips will form an inner wall composed of several layers of randomly oriented strips in the same manner as illustrated in FIGS. 1–3. The major part of the pollutants will immediately descend to the collecting box 26 while a smaller portion thereof will adhere both to the strips 9' and to the inner side of the filter tubes 2.

When the filters should be cleaned, the direction of the air flow through the unit is reversed as shown in FIGS. 13 and 14. The strips 9' will then be released from the inner sides of the filter tubes and are imparted a fluttering working movement by which the pollutants are separated both from the strips and from the inner sides of the filter tubes.

Figure 15:
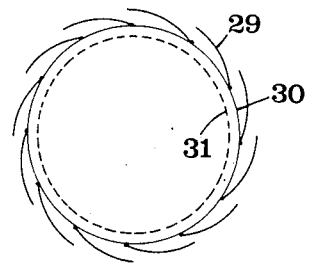

In FIG. 15, finally, there is shown another alternative embodiment in which a number of cover elements 29 are disposed on the front face, in this case the outer side, of a filter bag 30 which is not rigid and therefore is placed on a rigidifying basket 31 or the like. In this case, the air under normal operation is assumed to flow in a direction from outside and in through the filter bag. The same principle is however also applicable to the case where the air under normal operation is flowing from inside and out through the filter bag, the cover elements 29 being then arranged on the inner side of the filter bag which is placed inside a surrounding rigidifying holder.

CONCEIVABLE MODIFICATIONS OF THE INVENTION

Naturally, the invention is not restricted only to the embodiments described above and illustrated in the drawings. Thus, the term "filtering wall" as used in this specification and in the accompanying claims should be interpreted in its very widest sense and not be considered restricted only to folded stiff filter papers and filter bags. Thus, said filtering wall may be smooth instead of folded, and flat instead of cylindrical as is illustrated in the drawings. In principle, the filtering wall may have any suitable geometrical shape, provided it has one front face and one rear face. Further, it should be pointed out that the cover elements according to the invention may be modified in various ways, both in respect of their geometrical shape and in respect of the material from which they are made as well as their structure. In the case where the cover elements consist of a plurality of irregular strips covering each other, the strips may thus consist of an air-impermeable material, such as plastic, in which case the air can pass through the interstices between the strips. Finally, it should be pointed out that the invention is not restricted to such filters only as are used for purifying air. Thus, the filters of this invention can be used for purifying other gaseous media as well as liquid media.

I claim:

1. In a filter of the type comprising at least one filtering wall which has a front face and a rear face and which is normally permeated by the medium to be purified in a direction from the front face towards the rear face such that the pollutants entrained are separated at the front face of the filtering wall and adhere to said front face and the purified medium is allowed to pass through the wall, the flow of medium through said wall being reversible in order to remove said separated, adhering, pollutants from the front face of the filtering wall so as to clean said wall, the improvement wherein the front face of the filtering wall is equipped with a plurality of strip-shaped elastic cover elements which are moveable relative to the filtering wall and adapted upon reversal of the flow of medium, by elastic deformation under the action of said flow, to be removed wholly or partly from the wall while working said separated, adhering pollutants in order to facilitate the removal thereof from said front face of said filtering wall.

2. Filter as claimed in claim 1, wherein said cover elements are medium-permeable and pollutant-separating and adapted to substantially cover the entire surface of the filter wall during normal flow of the medium therethrough.

3. Filter as claimed in claim 2, wherein said cover elements comprise a fibrous or non-woven material.

4. Filter as claimed in claim 1, wherein each of said cover elements is flat or thin-walled and fixedly anchored at a first end while the opposite end is freely moveable.

5. Filter as claimed in claim 1 wherein said filtering wall comprises a suitably cylindrical tube and wherein said front face of said filtering wall is provided with a plurality of layers of strips arranged on each other and serving as said cover elements.

6. Filter as claimed in claim 5, wherein said cover elements comprise a plurality of skirt-like sets of strips provided along the length of said tube, each of which partly overlaps an adjacent set of strips.

7. Filter as claimed in claim 1 wherein said filtering wall comprises a suitably cylindrical tube whose front face is provided with a plurality of partly overlapping skirts formed from said strip-like cover elements.

8. Filter as claimed in claim 5 wherein said tube is open at both ends, said cover elements being disposed on the inner side of the tube wall.

9. Filter is claimed in claim 5 wherein said tube is open at one end only, said cover elements being disposed on the outer side of the tube wall.

10. Filter as claimed in claim 4 wherein individual cover elements are fixedly anchored along the edge of one of said cover element's long sides.

* * * * *